United States Patent [19]

Pease

[11] 4,280,527
[45] Jul. 28, 1981

[54] FLUID CONTROL VALVE AND SUPPORT ASSEMBLY

[76] Inventor: James F. Pease, 5805 Folkestone Dr., Dayton, Ohio 45459

[21] Appl. No.: 120,554

[22] Filed: Feb. 11, 1980

Related U.S. Application Data

[63] Continuation-in-part of Ser. No. 025,869, Apr. 2, 1979, which is a continuation-in-part of Ser. No. 818,433, Jul. 25, 1977, Pat. No. 4,149,554.

[51] Int. Cl.³ .............................................. F16K 51/00
[52] U.S. Cl. ..................................... 137/343; 251/143
[58] Field of Search ................ 251/143, 148; 137/343; 285/158, 189, 192, 193

[56] References Cited

U.S. PATENT DOCUMENTS

| 1,131,399 | 3/1915 | McGinley | 285/158 |
|---|---|---|---|
| 1,602,248 | 10/1926 | Page | 285/193 |
| 3,195,561 | 7/1965 | Sovitzky | 251/143 |
| 3,357,678 | 12/1967 | Dyki | 251/143 |
| 4,149,554 | 4/1979 | Pease | 137/343 |

Primary Examiner—Martin P. Schwadron
Assistant Examiner—A. Michael Chambers
Attorney, Agent, or Firm—Jacox & Meckstroth

[57] ABSTRACT

A solenoid actuated water control valve incorporates a molded plastic valve body which includes an inlet portion defining an inlet chamber and having a plurality of parallel spaced holes for receiving a set of screws. A drawn sheet metal tubular fitting has a tubular threaded portion integrally connected to a radial flange portion. In one embodiment, the flange portion corresponds generally to the shape of the inlet portion and has corresponding holes for receiving the screws. The screws also extend through corresponding holes within a support bracket which, in one embodiment, has an opening for receiving the tubular portion of the fitting so that torque applied to the fitting is transferred through the screws to the support bracket. In another embodiment, the drawn sheet metal fitting has a circular flange portion with pressed-in flat surfaces which engage mating flat surfaces defining the opening within the support bracket. In a further embodiment, the flange portion of the fitting has peripherally spaced recesses and outwardly projecting thinner ears which interfit and mate with corresponding ears and recesses spaced around the bracket opening. The ears and recesses are pressed into the fitting by the corresponding ears and recesses within the bracket, and in each embodiment, the fitting may be formed so that the tubular portion projects into the inlet portion of the valve body.

19 Claims, 11 Drawing Figures

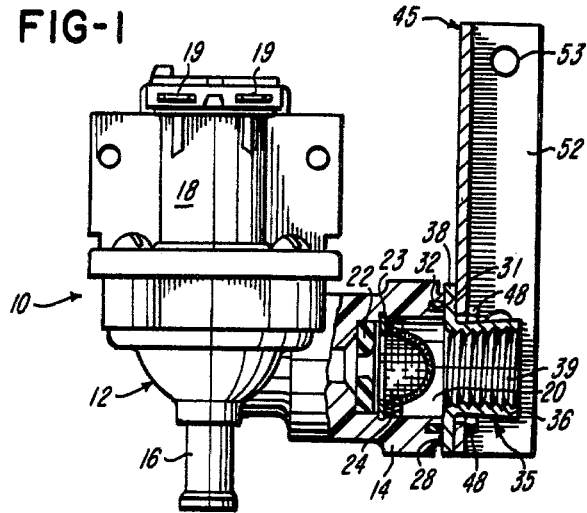
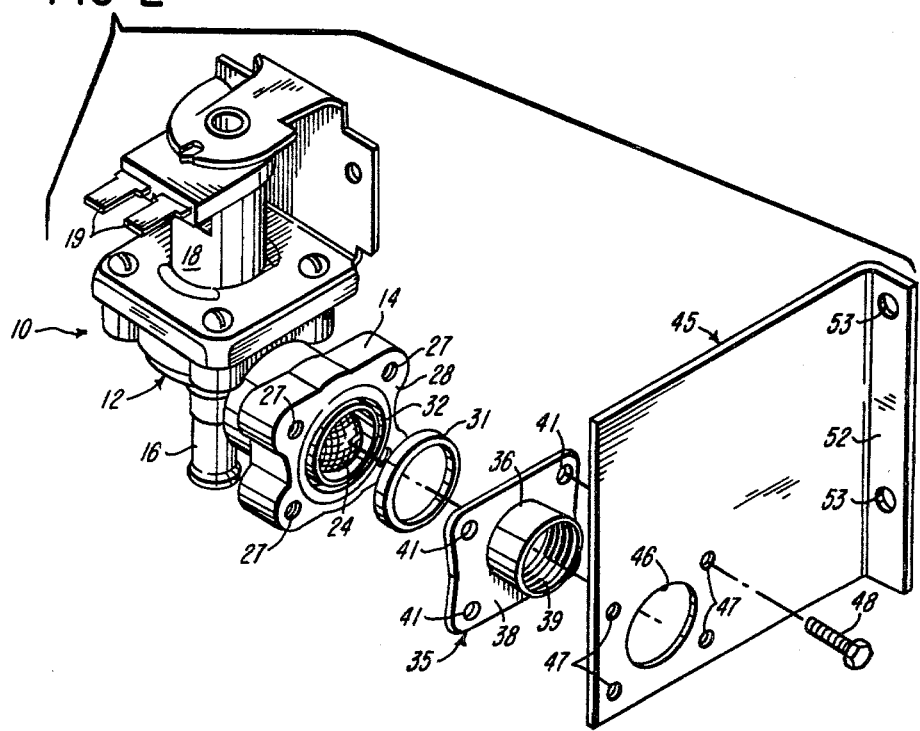

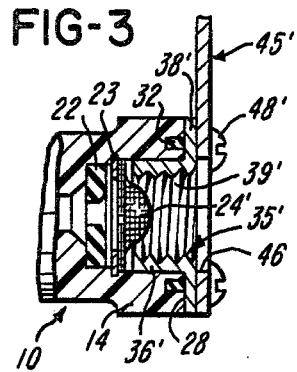

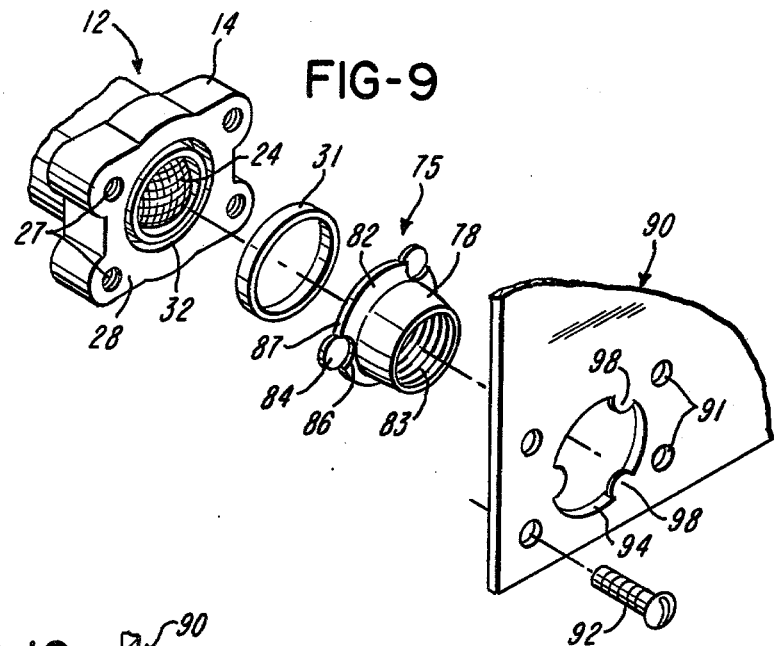
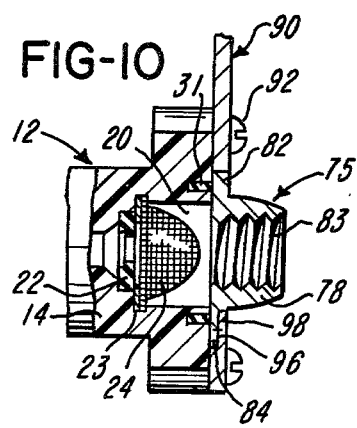
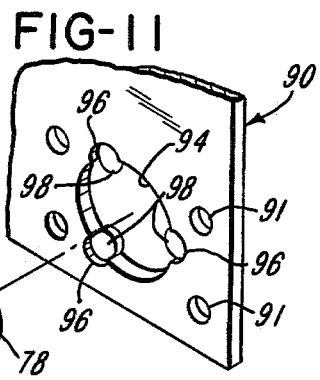
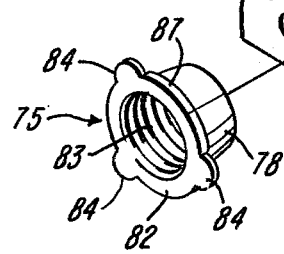

4,280,527

FLUID CONTROL VALVE AND SUPPORT ASSEMBLY

RELATED APPLICATION

This application is a continuation-in-part of application Ser. No. 025,869, filed Apr. 2, 1979 which is a continuation-in-part of Ser. No. 818,433, filed July 25, 1977, now U.S. Pat. No. 4,149,554.

BACKGROUND OF THE INVENTION

In the art of water control or fill valves commonly used in the appliance industry, it is conventional to use a pilot operated diaphragm which is controlled by a solenoid actuated plunger. In order to reduce costs of such a valve and to eliminate corrosion of the valve, the valve body is molded of thermoplastics material which forms the inlet and outlet portions of the valve body as well as a valve seat for receiving the pilot operated diaphragm. The inlet portion of the valve body defines a cylindrical passage or inlet chamber which is generally surrounded by a plurality of four parallel spaced holes. The holes receive corresponding screws which form threads within the plastic inlet portion of the valve body.

When such a pilot operated valve is used in a built-in appliance, for example, a built-in undercounter dishwashing machine, the valve is usually coupled to a tubular metal fitting such as shown in U.S. Pat. Nos. 2,936,780, 3,195,561 and 3,396,848. The tubular metal fitting is machined from solid metal bar stock and is provided with either external or internal pipe threads, for example, as shown in above U.S. Pat. Nos. 3,195,561 and 3,396,848, respectively, so that the fitting may be conveniently coupled to a water supply line.

As disclosed in these two patents, the metal fittings are machined with a shoulder having opposite flat surfaces which mate with corresponding flat edge surfaces of a hole or opening formed within a sheet metal support bracket for the valve. The mating flat surfaces are effective to transfer to the support bracket the torque applied to the fitting by a wrench during installation of the water supply line and thereby avoid transmitting the torque to or through the plastic valve body. The fittings must have substantial wall thickness in the area of the shoulder to prevent collapsing and rotation of the fitting when a substantial torque is applied during installation of a water supply line with a pipe wrench.

It is also common to machine the metal fitting from hexagonal bar stock in order to provide the fitting with a hexagonal flange portion and to provide the sheet metal bracket with an embossed mating hexagonal recess. The recess receives the flange portion to prevent rotation of the fitting relative to the support bracket when torque is applied to the fitting during installation of the water supply line. In order to form the hexagonal recess within the support bracket, it has been found necessary to form the support bracket from relatively heavy gauge sheet metal which significantly increases the cost of the support bracket. In addition, a relatively large press is required to press the hexagonal embossment and recess within the heavy gauge sheet metal.

SUMMARY OF THE INVENTION

The present invention is directed to an improved fluid control valve and support assembly which, as one important feature, significantly decreases the cost of manufacturing the assembly while increasing the resistance to torque applied to the assembly during connection with a water supply line. The control valve coupling and support assembly also provides for higher reliability in that the assembly provides for a more dependable fluid tight seal between the fitting and the inlet portion of a plastic valve body.

In accordance with one embodiment of the invention, the above features and advantages are provided by drawing a sheet of metal to form a fitting having a tapering tubular portion integrally connected to a relatively large radial flange portion. The flange portion is generally rectangular in configuration and corresponds generally to the rectangular configuration of the inlet portion of valve body. The flange portion of the drawn sheet metal tubular fitting is provided with peripherally spaced holes which align with the holes in the inlet portion of the valve body and with corresponding holes within a sheet metal support bracket. Thus the screws which couple the inlet portion of the valve body to the support bracket also extend through the holes within the flange portion of the fitting to provide a high torque resisting connection between the fitting and the support bracket. The tapering tubular portion of the drawn sheet metal fitting is provided with internal threads for connecting the fitting to the water supply line. The tubular portion may project outwardly from the bracket or inwardly into the inlet portion of the valve body.

In accordance with another embodiment of the invention, the drawn sheet metal fitting has a circular flange portion which is stamped to provide flat edge surfaces. The edge surfaces engage corresponding surfaces of the bracket opening which has a diameter substantially the same as the flange portion so that the flange portion projects into the bracket opening. In another embodiment of the invention, the circular flange portion of the drawn sheet metal fitting has peripherally spaced and outwardly projecting thinner ears overlying corresponding thin ears which are stamped from the sheet metal support bracket and project inwardly into the bracket opening. The ears are pressed into the fitting by the corresponding ears in the bracket during assembly of the fitting and bracket.

Other features and advantages of the invention will be apparent from the following description, the accompanying drawing and the appended claims.

BRIEF DESCRIPTION OF THE DRAWING

FIG. 1 is an elevational view of a fluid control valve and support assembly constructed in accordance with the invention and with the water inlet portion and support bracket of the assembly shown in section;

FIG. 2 is an exploded perspective view of the components which form the assembly shown in FIG. 1;

FIG. 3 is a fragmentary section similar to FIG. 1 and showing the fitting having a tubular portion which projects into the inlet portion of the valve body;

FIG. 4 is a fragmentary exploded perspective view of a fluid control valve and fitting assembly constructed in accordance with another embodiment of the invention;

FIG. 5 is a fragmentary section of the assembly shown in FIG. 4;

FIG. 6 illustrates the progressive steps for drawing the fitting shown in FIGS. 4 and 5;

FIG. 7 is an exploded view similar to FIG. 4 and showing a modified fitting constructed in accordance with the invention;

FIG. 8 is a fragmentary section similar to FIG. 5 and showing the assembly of the modified fitting shown in FIG. 7;

FIG. 9 is another fragmentary exploded view similar to FIG. 4 and showing a fitting and bracket constructed in accordance with another embodiment of the invention;

FIG. 10 is a fragmentary section of the assembly shown in FIG. 9; and

FIG. 11 is another exploded view of the fitting and bracket shown in FIG. 9.

DESCRIPTION OF THE PREFERRED EMBODIMENT

Referring to the drawings, FIG. 1 shows a water fill valve 10 of the type which is commonly used on an appliance such as an undercounter automatic dishwashing machine. The valve 10 includes a valve body 12 which is molded from a thermoplastics material and has a tubular inlet portion 14 and a tubular outlet portion 16. In a manner similar to that shown in U.S. Pat. Nos. 3,396,848 and 3,872,878, the valve body 12 also forms a circular valve seat (not shown) through which the flow of water is controlled by movement of a rubber diaphragm (not shown). The diaphragm is pilot operated by actuation of a solenoid 18 which is operated by power supply leads connected to the terminals 19 and automatically controlled by a programmed timer. The specific construction of the valve 10 forms no part of the present invention.

The inlet portion 14 of the molded plastic valve body 12 has a generally rectangular external configuration (FIG. 2) and defines an internal inlet chamber 20 which receives a pressure responsive resilient flow control washer 22, a spring C-type retaining ring 23 and a dome-shaped filter 24 constructed of a stainless steel wire mesh. A set of four parallel holes 27 (FIG. 2) are formed within the inlet portion 14 and are spaced uniformly around the inlet chamber 20. The holes 27 extend from a flat radial face 28 of the inlet portion 14, and a resilient sealing ring 31 is recessed within an annular groove 32 formed within the face 28 concentrically with the inlet chamber 20.

In accordance with the present invention, a tubular inlet fitting 35 is formed by drawing flat sheet metal to form a tubular portion 36 integrally connected to a radial flange portion 38 so that the tubular portion and flange portion have generally a uniform wall thickness. The tubular portion 36 has a slight tapered or frustoconical configuration and increases in diameter towards the right end (FIG. 1) of the fitting, and the tubular portion 36 is formed with internal pipe threads 39. The flange portion 38 of the sheet metal fitting 35 has a generally rectangular outer configuration (FIG. 2) which conforms generally to the configuration of the inlet portion 14 of the body 12 and is provided with a corresponding set of holes 41 which align with the holes 27 within the inlet portion.

The fill valve 10 is supported by a formed sheet metal bracket 45 which has a hole or opening 46 for receiving the tubular portion 36 of the fitting 35. The support bracket 45 also has a set of holes 47 which align with the holes 41 in the fitting 35 and with the holes 27 in the inlet portion 14 of the valve body 12. A set of four sheet metal screws 48 extend through the corresponding aligned holes 47 and 41 and form threads within the holes 27 of the plastic inlet portion 14. When the screws 48 are tightened (FIG. 1), the flange portion 38 of the fitting 35 is clamped between the inlet portion 14 of the valve body and the support bracket 45, and the resilient ring 31 forms a fluid-tight seal between the face 28 of the inlet portion 14 and the flange portion 38 of the inlet fitting 35. The support bracket 45 includes a right angle flange portion 52 which is provided with a set of vertically spaced holes 53 for securing the bracket 45 to the frame of the dishwashing machine.

When a water supply line is coupled to the inlet fitting 35, it is apparent that the torque applied to the fitting 35 in response to tightening of a pipe coupling, is transferred through the set of screws 48 to the support bracket 45 so that none of the torque is applied to the plastic valve body 12. Furthermore, as a result of the substantial radial spacing of the holes 41 relative to the center axis of the tubular inlet fitting 35, the fitting 35 can resist substantial torque without any possibility of shearing the screws 48. The construction of the fitting 35 from sheet metal also significantly reduces the manufacturing cost of the fitting in comparison with conventional fittings which are machined from solid metal bar stock. In addition, the use of the screws 48 for transmitting the torque from the fitting 35 to the support bracket 45 provides for substantial distribution of the torque and permits forming of the support bracket from relatively thin sheet metal, thereby significantly reducing the manufacturing cost of the bracket. The fitting 35 also eliminates the costly operation of embossing the support bracket.

Referring to FIG. 3 which shows a modification of the assembly in accordance with the invention, an inlet fitting 35' is constructed substantially the same as the inlet fitting 35 described above with the exception that the tubular portion 36' of the fitting 35' projects inwardly into the inlet chamber 20 defined by the valve body inlet portion 14. Thus the drawn sheet metal tubular portion 36' has a slight taper which corresponds in direction to the taper of the standard pipe threads 39', and the tubular portion terminates adjacent the fine wire mesh filter screen 24'. The flange portion 38' has the same configuration as the flange portion 38 of the fitting 35 and includes corresponding holes 41 for receiving the screws 48' which extend through the aligned holes 47 within the bracket 45 and are threaded into the holes 27 within the inlet portion 14 of the valve body 12. Since the tubular portion 36' of the fitting 35' projects inwardly into the inlet portion 14 of the valve body 12, the tubular portion 36' is not exposed for gripping by a pipe wrench or a similar gripping tool. This feature is desirable since the fitting 35' is drawn from sheet metal, and the tubular portion 36' has a relatively thin wall thickness which could possibly be deformed by the unnecessary attachment of a pipe wrench.

Another embodiment of the invention is illustrated in FIGS. 4 and 5. In this embodiment, an inlet fitting 55 is progressively stamped or formed from a sheet metal disc 56 (FIG. 6) to provide the fitting with a tubular portion 58 projecting from an integral flange portion 61. In the progressive stamping or forming steps, the flange portion 61 is stamped or pressed to form a pair of diametrically opposite flat surfaces 62 which extend from corresponding relatively thin sections 63 of the flange portion 61. As illustrated, the flange portion 61 has a thickness of approximately 0.075 inch, and the sections 63 have a thickness of approximately 0.020 inch.

As shown by the progressive forming steps in FIG. 6, after the flange sections 61 and the flat surfaces 62 are pressed into the metal, the flange portion 61 is trimmed to produce a precisely circular flange portion 61 including the flange sections 63. The ring 66 trimmed from the flange portion 61 is collected as scrap, and the tubular portion 58 is then provided with internal pipe threads 69 which may be roll-formed or tapped as a secondary operation.

As shown in FIG. 4, the valve body is supported by a sheet metal bracket 70 which has a set of holes 71 for receiving corresponding screws 72. The screws 72 are threaded into the holes 27 of the valve body inlet portion 14 to secure the inlet portion 14 rigidly to the bracket 70. A part-circular hole or opening 74 is formed within the sheet metal bracket 70, and the opening 74 is partially defined by opposing flat surfaces 76 which mate or conform to the corresponding flat surfaces 62 pressed into the fitting 55. The diameter of the part-circular surfaces forming the opening 74 is slightly greater than the diameter of the circular flange portion 61 of the fitting 55 so that part of the flange portion 61 projects into the opening 74.

As shown in FIG. 5, the valve body inlet portion 14 has a slight circular recess within the face 28 adjacent the groove 32, and the recess receives part of the flange portion 61 of the inlet fitting 55 by having a depth corresponding to the thickness of the flange sections 63. FIG. 5 also shows the final assembly of the bracket 70 and inlet fitting 55 to the valve body inlet portion 14 with the resilient ring 31 forming a water-tight seal between the flange portion 61 and the valve body inlet portion 14. As a result of the drawn circular flange portion 61, the sheet metal fitting 55 provides for a further cost savings over the savings provided by the drawn sheet metal fitting 35 described above in connection with FIGS. 1 and 2.

A modification of the fitting 55 and its assembly between the valve body 12 and support bracket 70 are illustrated in FIGS. 7 and 8. In this modification, a fitting 55' is progressively formed or stamped from sheet metal in the same manner as the fitting 55. However, in this modification the flat surfaces 62' are formed or pressed into the opposite side of a circular flange portion 61', and the tapered pipe threads 69' extend from the flange portion 61' so that a water supply line pipe or fitting is initially threaded into the end having the flange portion 61'.

As shown in FIG. 8, the fitting 55' is assembled between the bracket 70 and the valve body inlet portion 14 in the same manner as the fitting 35' is assembled, as discussed above in connection with FIG. 3. That is, the tubular portion 58' of the fitting 55' projects inwardly into the chamber 20, and the flange portion 61' projects both into the opening 74 within the bracket 70 and into the recess within the face 28 of the valve body. As mentioned above, the assembly of the fitting 55', as shown in FIG. 8, with the tubular portion 58' projecting into the valve body 12, eliminates the possibility of the tubular portion being damaged by being hit or by the attachment of a wrench when the fitting is connected to a water supply line. In addition, the slight taper of the tubular portion 58' is in the same direction as the taper of the standard pipe threads 59' which is desirable for maintaining a substantially uniform wall thickness along the tubular portion 58'.

Another embodiment of the invention is illustrated in FIGS. 9-11. In this embodiment, a tubular inlet fitting 75 is drawn from sheet metal such as brass by progressive steps similar to the steps shown in FIG. 6. The fitting 75 includes a tubular portion 78 and a circular flange portion 82, and the tubular portion 78 has roll-formed internal pipe threads 83. The flange portion 82 is pressed or impacted at three uniformly spaced peripheral locations to form outwardly projecting ears 84. Each of the ears 84 has a circular configuration and is defined by a substantially semi-circular recess 86 within the flange portion 82 and a substantially semi-circular portion projecting outwardly from the part-cylindrical outer surfaces 87 of the flange portion 82.

Each ear 84 also has a thickness approximately one-half of the thickness of the remainder portion of the flange 82. Since the portion of each ear 84 projecting outwardly from the part-cylindrical outer surfaces 87 is formed when the corresponding recess 86 is pressed into the flange portion, no additional material is required outwardly of the diameter of the surfaces 87 to form the fitting 75, thus minimizing the diameter of the flat blank required to produce the fitting by the steps shown in FIG. 6.

A sheet metal support bracket 90 is formed from a relatively light-gauge metal such as 15 gauge steel in the same manner as the support brackets 45 and 70 mentioned above. The bracket 90 has a set of holes 91 which align with the holes 27 in the valve body inlet portion 14 for receiving a corresponding set of mounting screws 92. The sheet metal bracket 90 is punched to form a circular hole or opening 94 having a diameter corresponding to the diameter of the flange surfaces 87 of the fitting 75. The sheet metal is then pressed or impacted at three uniformly spaced peripheral locations to form a set of three semi-circular recesses 96 and corresponding inwardly projecting semi-circular ears 98. The depth of the recesses 96 is the same as the thickness of the ears 84 on the fitting 75, and the ears 98 and recesses 96 correspond in size and configuration to the ears 84 and recesses 86 within the flange portion 82 of the fitting 75.

As illustrated in FIG. 10, when the inlet fitting 75 is inserted into the opening 94 within the bracket 90, the ears 84 of the fitting 75 project into the corresponding recesses 96 within the bracket 90, and the ears 98 within the bracket 90 project into the corresponding recesses 86 within the flange portion 82 of the fitting 75. As a result, the fitting 75 is positively prevented from rotating within the bracket 90 when a water supply line is coupled to the fitting 75 and torque is applied to the fitting through the line which is tightened within the threaded tubular portion 78 of the fitting.

It is also within the scope of the invention to press the recesses 86 and ears 84 into the fitting 75 with the preformed ears 98 in the bracket 90, thereby providing a positively and rigidly connected sub-assembly. When the fitting 75 is assembled, as shown in FIG. 10, the inner radial face of the flange portion 82 and ears 84 is flush with the adjacent surface of the bracket 90, and the outside diameter of the flange portion 82 is slightly greater than the outside diameter of the groove 32. This permits the face 28 of the valve body portion 14 to engage the adjacent surface of the bracket 90, and the resilient sealing ring 31 forms a positive water-tight seal between the valve body portion 14 and the fitting 75.

The valve support and fitting assembly shown in FIGS. 9-11 also provides desirable advantages. As one important advantage, the construction of the fitting 75 and the bracket 90 provides for minimizing the metal or brass which forms the inlet fitting 75 so that the cost of producing the fitting 75 is minimized. In addition, the assembly provides for transferring a substantially high torque from the fitting 75 to the bracket 90 as a result of the overlying and interfitting ears 84 and 98 within the recesses 96 and 86, respectively. It has also been found that a punch press of relatively low tonnage may be used for forming the ears 84 within the flange portion 82 of the fitting 75 and for forming the ears 98 within the steel bracket 90. This also contributes to minimizing the cost of the assembly in that less expensive machinery is required for producing the fitting 75 and bracket 90. As mentioned above, after forming the recesses 96 and ears 98 on the steel bracket 90, the ears 98 may be used for pressing the recesses 86 and forming the ears 84 on the relatively softer brass fitting 75. This is accomplished by pressing the fitting 75 into the hole 94 without previously forming the recesses 86 and ears 84 in the flange portion 82 of the fitting 75. It is also within the scope of the invention to substitute for the screws 92 other screws having larger washer-type heads which overlap the flange 82 of the fitting 75 to provide additional positive retention of fitting within the hole 94 for resisting substantially high hydraulic pressure within the valve chamber 20.

While the assemblies herein described and their method of construction constitute preferred embodiments of the invention, it is to be understood that the invention is not limited to these precise assemblies and methods, and that changes may be made therein without departing from the scope and spirit of the invention as defined in the appended claims. For example, the fitting 75 and bracket 90 may be constructed with four corresponding recesses and ears.

The invention having thus been described, the following is claimed:

1. In a valve assembly including a valve body of molded plastics material, said valve body having an inlet portion defining an inlet and an outlet portion defining an outlet, means supported by said valve body for controlling the flow of fluid from said inlet to said outlet, said inlet portion including a plurality of parallel spaced holes disposed generally around said inlet, a metal fitting including a threaded tubular portion projecting from an outwardly projecting integral flange portion disposed adjacent said inlet portion of said valve body, means forming a fluid-tight seal between said flange portion and said inlet portion, a sheet metal bracket having an aperture aligned with said tubular portion of said fitting and a plurality of holes aligned with said holes within said inlet portion of said valve body, and a plurality of threaded fasteners extending within said holes for securing said bracket to said valve body with said flange portion of said fitting disposed therebetween, the improvement wherein said fitting comprises a drawn sheet metal fitting, said sheet metal fitting having means defining at least one recess extending inwardly from the periphery of said flange portion, said recess forming an outwardly projecting ear portion having a thickness less than the thickness of said flange portion, said aperture within said support bracket being of sufficient size to receive said flange portion of said fitting, said support bracket including means forming at least one ear projecting inwardly into said aperture, and said ear on said bracket overlying said ear portion on said fitting and projecting into said recess within said flange portion of said fitting.

2. The assembly defined in claim 1 wherein said flange portion of said fitting has an end surface substantially flush with a side surface of said sheet metal bracket.

3. The assembly defined in claim 1 wherein said flange portion of said fitting has a plurality of peripherally spaced said recesses and corresponding said ear portions, and said bracket includes a plurality of corresponding said ears projecting inwardly into said recesses within said fitting.

4. The assembly defined in claim 1 wherein said recess within said flange portion of said fitting has a generally semi-circular configuration.

5. The assembly defined in claim 4 wherein said ear on said bracket has a generally semi-circular configuration conforming to said recess within said fitting.

6. The assembly defined in claim 1 wherein said flange portion of said fitting and said aperture within said bracket form a press-fit connection.

7. The assembly defined in claim 1 wherein substantially all of said flange portion of said fitting is disposed within said aperture in said bracket.

8. In a valve assembly including a valve body of molded plastics material, said valve body having an inlet portion defining an inlet and an outlet portion defining an outlet, means supported by said valve body for controlling the flow of fluid from said inlet to said outlet, said inlet portion including a plurality of parallel spaced holes disposed generally around said inlet, a metal fitting including a threaded tubular portion projecting from an outwardly projecting integral flange portion disposed adjacent said inlet portion of said valve body, means forming a fluid-tight seal between said flange portion and said inlet portion, a sheet metal bracket having an aperture aligned with said tubular portion of said fitting and a plurality of holes aligned with said holes within said inlet portion of said valve body, and a plurality of threaded fasteners extending within said holes for securing said bracket to said valve body with said flange portion of said fitting disposed therebetween, the improvement wherein said fitting comprises a drawn sheet metal fitting, said sheet metal fitting having means defining at least one peripheral recess extending inwardly from the periphery of said flange portion and forming an outwardly projecting ear having a thickness less than the thickness of said flange portion, said aperture within said support bracket being of sufficient size to receive said flange portion of said fitting, said support bracket including means defining at least one recess extending outwardly from said aperture, and said ear on said flange portion of said fitting projecting outwardly into said recess within said bracket.

9. The assembly defined in claim 8 wherein said flange portion of said fitting has a thickness substantially the same as the thickness of said bracket.

10. The assembly defined in claim 8 wherein said flange portion of said fitting has a plurality of peripherally spaced said recesses and corresponding said ear portions, and said bracket includes a plurality of corresponding said recesses receiving said ears within said fitting.

11. The assembly defined in claim 10 wherein said ears on said fitting each has a generally semi-circular configuration.

12. The assembly defined in claim 8 wherein said flange portion of said fitting and said aperture within said bracket form a press-fit connection.

13. The assembly defined in claim 8 wherein substantially all of said flange portion of said fitting is disposed within said aperture in said bracket.

14. In a valve assembly including a valve body of molded plastics material, said valve body having an inlet portion defining an inlet and an outlet portion defining an outlet, means supported by said valve body for controlling the flow of fluid from said inlet to said outlet, said inlet portion including a plurality of parallel spaced holes disposed generally around said inlet, a metal fitting including a threaded tubular portion projecting from an outwardly projecting integral flange portion disposed adjacent said inlet portion of said valve body, means forming a fluid-tight seal between said flange portion and said inlet portion, a sheet metal bracket having an aperture aligned with said tubular portion of said fitting and a plurality of holes aligned with said holes within said inlet portion of said valve body, and a plurality of threaded fasteners extending within said holes for securing said bracket to said valve body with said flange portion of said fitting disposed therebetween, the improvement wherein said fitting comprises a drawn sheet metal fitting, said sheet metal fitting having means defining a plurality of peripherally spaced recesses extending inwardly from the periphery of said flange portion and forming a corresponding plurality of outwardly projecting ears, each said ear having a thickness less than the thickness of said flange portion, said aperture within said support bracket being of sufficient size to receive said flange portion of said fitting, said support bracket including means defining a plurality of recesses extending outwardly from said aperture at peripherally spaced locations around said aperture and forming corresponding ears projecting into said aperture, said ears on said bracket having a thickness less than the thickness of said bracket and overlying said ears on said flange portion of said fitting, said ears on said bracket projecting inwardly into corresponding said recesses within said flange portion of said fitting, and said ears on said flange portion of said fitting projecting outwardly into corresponding said recesses within said bracket.

15. The assembly defined in claim 14 wherein said flange portion of said fitting has a thickness substantially the same as the thickness of said bracket.

16. The assembly defined in claim 14 wherein each said recess has a generally semi-circular configuration, and each said ear includes an outwardly projecting portion having a generally semi-circular configuration conforming to the corresponding said recess.

17. The assembly defined in claim 14 wherein said flange portion of said fitting and said aperture within said bracket form a press-fit connection.

18. The assembly defined in claim 14 wherein substantially all of said flange portion of said fitting is disposed within said aperture in said bracket.

19. The assembly defined in claim 14 wherein at least one of said fasteners has means overlapping said flange portion of said fitting to assure positive retention of said flange portion within said aperture.

* * * * *